United States Patent [19]
Munekata

[11] Patent Number: 5,126,900
[45] Date of Patent: Jun. 30, 1992

[54] DISK GRIPPING DEVICE

[75] Inventor: Kazumi Munekata, Kanagawa, Japan

[73] Assignee: Sony Corporation, Tokyo, Japan

[21] Appl. No.: 609,153

[22] Filed: Nov. 5, 1990

[30] Foreign Application Priority Data

Nov. 8, 1989 [JP] Japan .................. 1-290331

[51] Int. Cl.⁵ .......................................... G11B 17/022
[52] U.S. Cl. ......................... 360/99.12; 360/99.05; 360/99.08
[58] Field of Search ............ 360/98.07, 99.04, 99.05, 360/99.08, 99.09, 99.12

[56] References Cited

U.S. PATENT DOCUMENTS

| | | | |
|---|---|---|---|
| 4,672,486 | 6/1987 | Bettini | 360/99.05 |
| 4,825,314 | 4/1989 | Maekawa et al. | 360/99.08 |
| 4,855,850 | 8/1989 | Nagaoka et al. | 360/99.05 X |
| 4,873,595 | 10/1989 | Taguchi et al. | 360/99.05 |
| 4,903,155 | 2/1990 | Maekawa et al. | 360/99.05 X |
| 4,989,107 | 1/1991 | Tsukahara | 360/99.08 |
| 5,010,427 | 4/1991 | Taguchi et al. | 360/99.05 |

Primary Examiner—John H. Wolff
Attorney, Agent, or Firm—Lewis H. Eslinger; Jay H. Maioli

[57] ABSTRACT

A device is provided for gripping a disk-like recording medium on a turntable. The recording medium is provided with a core, the core being formed with a central aperture and a positioning aperture. The central aperture has a pair of adjacent edges that are substantially perpendicular to each other, and the position aperture has a peripheral-side edge and a forward-side edge. The disk gripping device is characterized in that a contact point of a fulcrum hole of a swingable member with a fulcrum pin is held at a substantially predetermined edge position of the fulcrum hole which is nearest to a drive pin, both before and after the recording medium is gripped on the turntable.

7 Claims, 10 Drawing Sheets

DISK GRIPPING DEVICE

BACKGROUND OF THE INVENTION

1. Field of the Invention

The present invention relates to a disk gripping device most suitably applied to, for example, a floppy disk apparatus.

2. Description of the Related Art

Conventionally, a disk gripping device shown in FIGS. 1 to 6 is used for a floppy disk apparatus.

As shown in FIG. 4, this prior art device is arranged such that a turntable 2 is horizontally secured to the outer circumference of a vertical shaft 1, at a position lower than the upper end of the shaft 1 and rotated by a motor (not shown) so that the turntable 2 is integrally rotated with the shaft 1, and a magnetic plate 3 and a friction plate 4 as a sliding sheet are mounted on the upper surface of the turntable 2 at different heights around the outer circumference of the shaft 1. Further, a swingable member 5 disposed along the lower surface of the turntable 2 is mounted on a fulcrum pin 6 downwardly and vertically fitted into a fulcrum hole 7 provided in the above turntable 2 by press fitting or the like. More specifically, the swingable member 5 is secured to the turntable 2 so that it can rotate about the fulcrum pin 6 in the directions of arrows a and b in FIG. 5B, and is pressed against the lower surface of the turntable 2 by an elastic member 8 having a leaf spring structure (FIG. 4) and fitted to the fulcrum pin 6 at the lower portion of the swingable member 5. A drive pin 9 composed of a bearing vertically secured to the swingable member 5 is fitted into a through hole 10 defined in the turntable 2 and projected to substantially the same height as the shaft 1 above the turntable 2. A leaf spring 11 integrally formed with the swingable member 5 by pressing is biased by a pin secured to the lower surface of the turntable 2 so that the swingable member 5 is urged in the direction of an arrow a in FIG. 5A by the elastic force of the leaf spring 11.

Note, as shown in FIG. 5A, before a floppy disk 14 is gripped, the swingable member 5 is urged in the direction of the arrow a about the fulcrum pin 6 by an elastic force of the spring 11, so that the drive pin 9 secured to the swingable member 5 abuts against the peripheral edge 10a of the through hole 10 of the turntable 2 to be positioned.

Next, when the floppy disk 14 is gripped, the core 15 of the floppy disk 14 as a disk-like recording medium is horizontally mounted on the turntable 2 as shown in FIG. 4 in a state that the turntable 2 is rotated in the direction of an arrow c by the shaft 1, as shown in FIGS. 3 and 4.

At that time, the shaft 1 and the drive pin 9 are fitted into a substantially square-shaped central aperture 16 defined at the center of the core 15 composed of a magnetic substance and a substantially rectangular positioning aperture 17 defined at the outer periphery of the core 15 and having a lengthwise direction inclined by a predetermined angle with respect to the central aperture 16, respectively, and thus the core 15 is horizontally and magnetically gripped on a friction plate 4 of the turntable 2 by the magnetic plate 3.

When the turntable 2 is rotated in the direction of the arrow c at a high speed after the floppy disk 14 is gripped, the floppy disk 14 is rotated in a cassette (not shown) in the direction of the arrow c at a high speed by the drive pin 9 through the core 15. Then, a pair of upper and lower magnetic heads (not shown) in contact with both the upper and lower sides of the floppy disk 14 scan the floppy disk 14 in the radial direction thereof to carry out a desired recording and reproduction. At that time, a loss torque Y is produced in a direction (the direction of an arrow d) opposite to a rotating direction of the turntable 2 (the direction of the arrow c) by frictional forces produced between the floppy disk 14 and the magnetic heads and between the floppy disk 14 and a liner (not shown) in the cassette.

Therefore, the drive pin 9 is guided to the outer periphery 17b of the positioning aperture 17 and in the direction approaching the shaft 1 of the turntable 2, with the result that the swingable arm 5 is rotated in the direction of the arrow b in FIG. 3 against the leaf spring 11. Accordingly, the drive pin 9 is pressed against the forward-side edge 17a (rotating in the direction of the arrow c) of the rectangular positioning aperture 17 of the core 15 and the peripheral-side edge 17b thereof perpendicular to the forward-side edge 17a, by vertical forces $F_1$, $F_2$, respectively. Two edges 16a, 16b of the central aperture 16 of the core 15, which are at right angles to each other, are pressed against the circumference of the shaft 1 by forces $R_1$, $R_2$, which are reaction forces of the vertical forces $F_1$, $F_2$, and as a result, the core 15 is positioned with respect to the shaft 1 by a resultant force having a line of action coinciding with a diagonal $P_1$ of the substantially square-shaped central aperture 16.

Note that the following equations are obtained, assuming that a center line passing through the center $O_1$ of the shaft 1 and the center $O_3$ of the fulcrum pin 6 is a Y-coordinate axis, a coordinate axis passing through the above center $O_1$ and intersecting the Y-coordinate axis at right angles is an X-coordinate axis, $P_2$ represents a center line passing through the center $O_2$ of the drive pin 9 and the center $O_3$ of the fulcrum pin 6, l represents a distance between the centers $O_2$ and $O_3$, $\theta$ and $\phi$ represent angles between the center line $P_2$ and the Y-coordinate axis and the diagonal $P_1$ and the Y-coordinate axis, respectively, and further, $F_3$ represents an initial positioning force applied by the spring 11 to the drive pin 9, as shown in FIG. 5B.

$$F_1 = T/l \cdot \sin\theta \qquad (1)$$

$$F_2 = T/l \cdot \cos\theta + F_3 \qquad (2)$$

$$\phi = \tan^{-1}(F_2/F_1) \quad 60° \qquad (3)$$

An ideal gripping can be provided by designing the disk gripping device satisfying the above equation (3).

Nevertheless, since this kind of disk gripping device is arranged such that the fulcrum pin 6 is fitted into the fulcrum hole 7 of the swingable member 5, to enable the swingable member 5 to be rotated in the direction of the arrows a, b about the fulcrum pin 6, a fit clearance between the fulcrum pin 6 and the fulcrum hole 7 cannot be made substantially zero, and when observed on an enlarged scale, a fit clearance 18 exists between the fulcrum pin 6 and the fulcrum hole 7, as shown in FIGS. 5A and 5B.

Moreover, as shown in FIGS. 5A and 5B, the leaf spring applies a load $F_3$ to the swingable member 5 in a direction substantially parallel to the center line $P_2$, in such a manner that the direction is inclined by an angle $\theta$, to the direction in which the turntable 2 is rotated (the direction of the arrow c) with respect to the center line x' of a pin 12, which is parallel to the X-coordinate axis, so that the swingable arm is urged in the direction of the arrow a.

Therefore, as shown in FIG. 5A, when the floppy disk 14 is gripped, a contact point $P_3$ of the fulcrum hole 7 with the fulcrum pin 6 conventionally tends to be moved in the direction of an arrow e, which is opposite to the drive pin 9 with respect to the center $O_3$ of the fulcrum pin 6.

On the other hand, after the floppy disk 14 is gripped, the above contact point $P_3$ tends to be moved in the direction of an arrow f, which is nearer to the drive pin 9 with respect to the center $O_3$ of the fulcrum pin 6, because the swingable member 5 receives the loss torque T in the direction of the arrow d in FIG. 5B. After the floppy disk is gripped, however, the position of the above contact point $P_3$ is changed with a change of the loss torque T and a coefficient of friction of the core 15 to the friction plate 4.

Therefore, conventionally, when the floppy disk 14 is mounted on or dismounted from the turntable 2, a position of the above contact point $P_3$ is liable to be greatly changed in the direction of the arrows e, f along the outer periphery of the fulcrum pin 6, by a difference D between the diameters of the fulcrum pin 6 and the fulcrum hole 7 as shown in FIG. 6, and a large amount of change $\Delta l$ corresponding to the above clearance 18 is liable to be incurred at the arm length l of the swingable member 5 after the floppy disk is gripped, as shown in FIG. 5B.

When the large amount of change $\Delta l$ is incurred at the arm length l, a location at which the core 15 is positioned with respect to the shaft 1 is changed in the circumferential direction, to thus change an index position recorded on the floppy disk 14 in the circumferential direction, and therefore, a serious problem arises in that the index position cannot be read.

Further, a problem arises in that, since the turntable 2 and the fulcrum pin 6 are arranged as separate parts, the number of parts is increased accordingly and the fulcrum hole 7 (FIG. 4) must be defined in the turntable 2, to enable the fulcrum pin 6 to be attached thereto.

Furthermore, after the fulcrum pin 6 is fitted into the fulcrum hole 7, a process for fixing the extreme end of the fulcrum pin 6 by a screw or caulking, or the like, is also needed. In addition, a problem arises in that an accuracy of the center of rotation of the swingable member 5 is lowered due to a positional dislocation caused when the fulcrum pin 6 is secured to the turntable, and the insertion of the elastic member 8 of the leaf spring structure into a narrow space between the swingable member 5 and the flange provided at the lower end of the fulcrum pin 6 is very difficult, and the like.

OBJECTS OF THE INVENTION

An object of the present invention is to solve the above-mentioned problems of the prior art and to provide a disk gripping device giving a pinpoint accuracy by eliminating a positional dislocation caused when a floppy disk is gripped.

Another object of the present invention is to provide a disk gripping device in which a position of a swingable member is little changed when a floppy disk is mounted and dismounted.

A further object of the present invention is to provide a disk gripping device which has a smaller number of parts and is easily workable when the disk gripping device is assembled.

BRIEF DESCRIPTION OF THE DRAWINGS

FIG. 9, are plan views comparing a change of positions of swingable members of the disk gripping device according to the present invention (FIGS. 9C and 9D) with that of the disk gripping device according to the prior art (FIGS. 9A and 9B), before and after the floppy disk is gripped;

DESCRIPTION OF THE PREFERRED EMBODIMENTS

An embodiment of a disk gripping device according to the present invention applicable to a floppy disk apparatus will be described below with reference to FIGS. 7 and 8. Note that the same numerals as used in FIGS. 1 to 6 are used to designate the same parts in FIGS. 7 and 8, to avoid a duplication of the description thereof.

Figure 7:
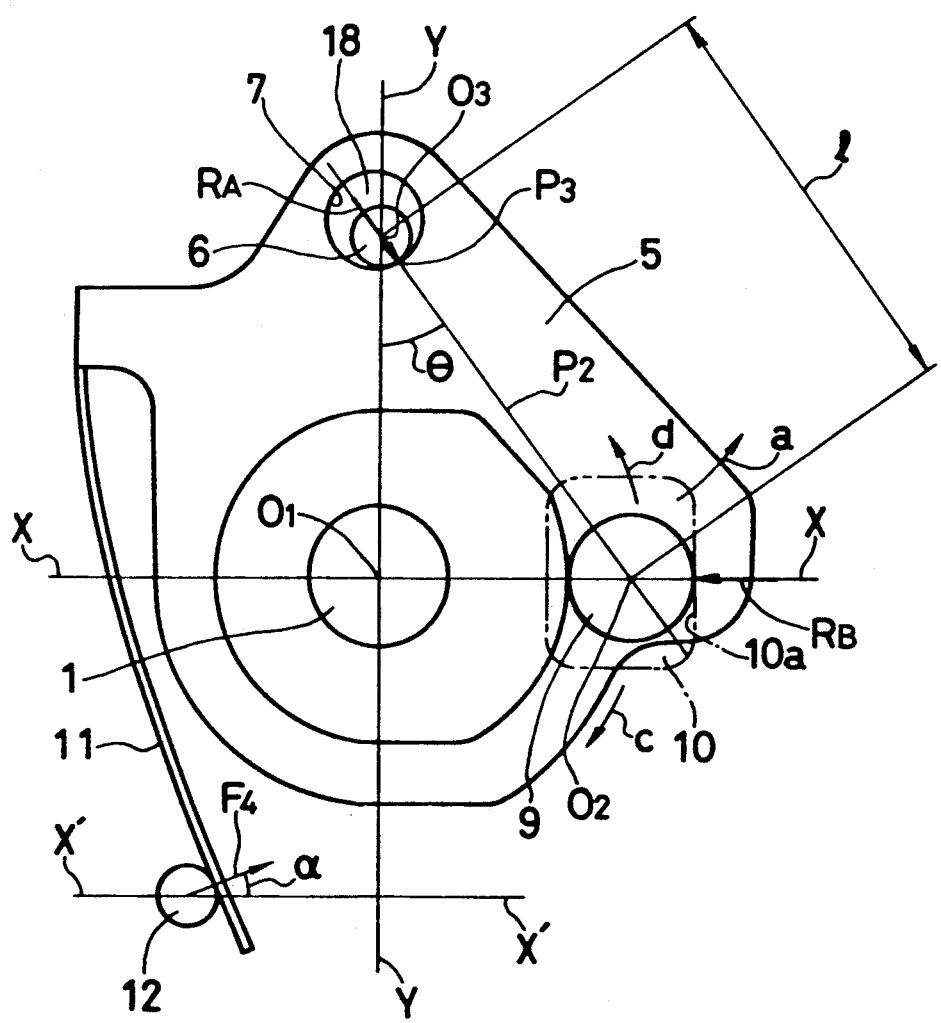
FIG. 7 is a plan view, partly in cross section, of major elements of a disk gripping device of an embodiment according to the present invention, before a floppy disk is gripped.

The present invention is designed in such a manner that, as shown in FIG. 7, which shows the state when a floppy disk not gripped, an inclination $\theta$ of a linear line $P_2$ connecting the center $O_3$ of a fulcrum pin 6 of a swingable member 5 to the center $O_2$ of a drive pin 9 with respect to a Y-coordinate axis is introduced to the following equations (4) and (5), and an initial positioning force $F_4$ of a spring 11 satisfying these equations (4) and (5), by which the drive pin 9 is initially positioned, is determined and used for the design.

$$F_4 \cos \alpha + RA \cdot \sin \theta - RB = 0 \qquad (4)$$

$$F_4 \sin \alpha + RA \cdot \cos \theta = 0 \qquad (5)$$

where, $\alpha$ is an inclination of $F_4$ with respect to the center line x' of a pin 12 in parallel to an X-coordinate axis, and RA and RB are reaction forces produced when $F_4$ is applied to the swingable member 5.

Figure 8:
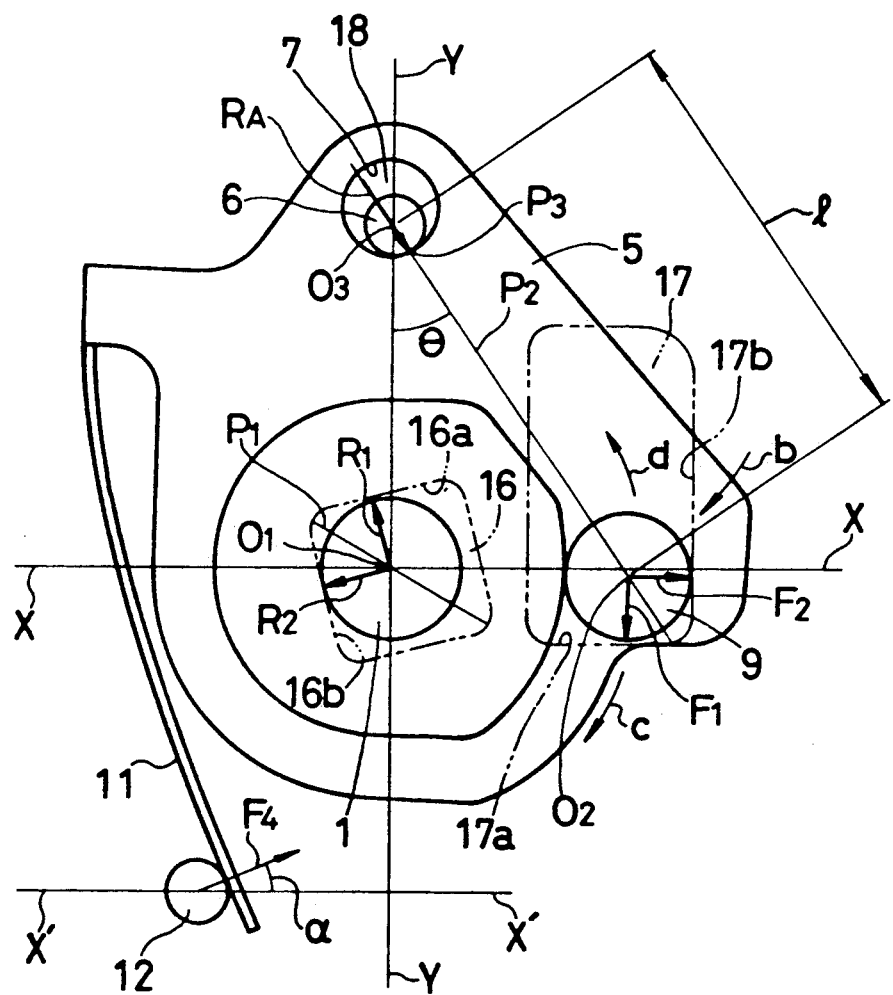
FIG. 8 is a plan view, partly in cross section, of the major elements of the disk gripping device of the embodiment according to the present invention, after the floppy disk is gripped.

With the design as described above, even if a clearance 18 exists between the fulcrum pin 6 and a fulcrum hole 7 of the swingable member 5, a contact point $P_3$ of the fulcrum hole 7 with the fulcrum pin 6 can be held at a substantially predetermined edge position of the fulcrum hole, which is nearer to the drive pin 9 with respect to the center $O_3$ of the fulcrum pin 6, both before the floppy disk is gripped as shown in FIG. 7, and after the floppy disk is gripped as shown in FIG. 8.

More specifically, as shown in FIGS. 7 and 8, a direction in which a force $F_4$ is applied by the spring 11 is inclined by an angle in the direction (direction of an arrow d) opposite to the rotating direction of a turntable 2 (direction of an arrow c) with respect to the center line x'.

FIGS. 9A, 9B, 9C, and 9D compare a change of a position of the swingable member of the disk gripping device of the prior art with that of the present invention before and after the floppy disk is gripped.

Figure 9A:
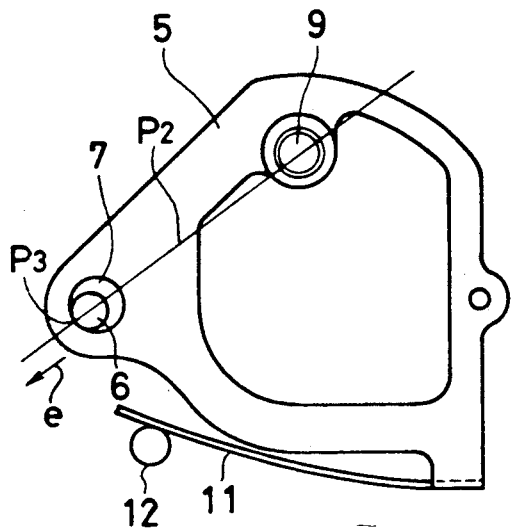
FIGS. 9A, 9B, 9C and 9D, forming
Figure 9B:
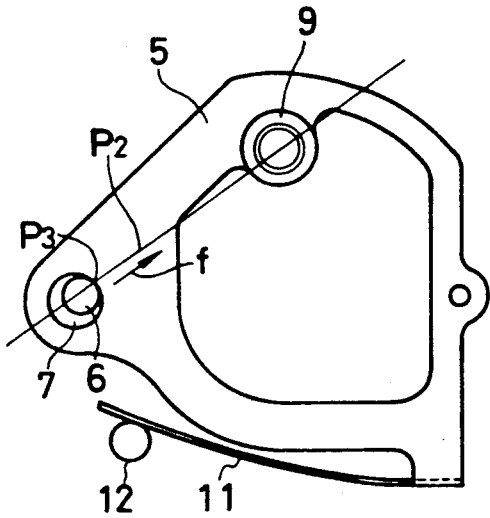
Figure 9C:
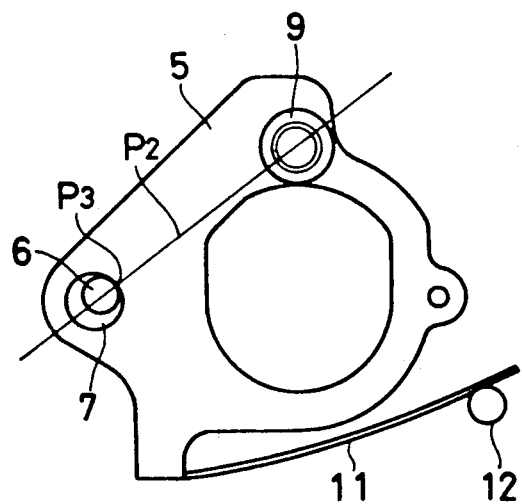
Figure 9D:
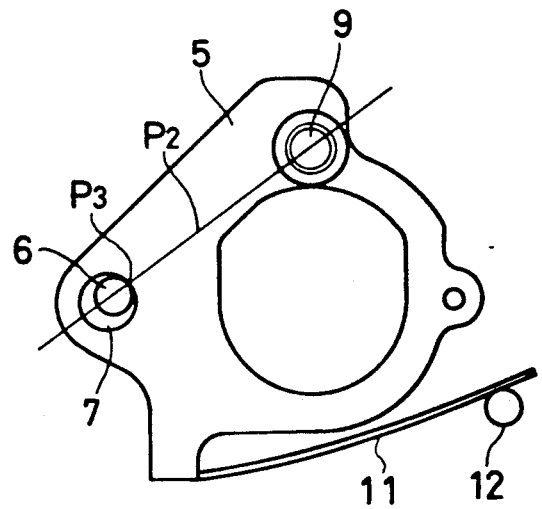

FIGS. 9A and 9B show the position of the swingable member of the disk gripping device of the prior art, before and after the floppy disk is gripped. As apparent from the drawings, the position of the swingable member is moved in the directions of arrows e and f along the linear line $P_2$ with respect to the fulcrum pin 6, before and after the floppy disk is gripped. On the hand, as apparent from FIG. 9C (before the floppy disk is gripped) and FIG. 9D (after the floppy disk is gripped), in the disk gripping device according to the present invention, the position of the swingable member with respect to the fulcrum pin 6 is not changed.

As described above, when the contact point $P_3$ of the fulcrum hole 7 of the swingable member 5 with the fulcrum pin 6 is held at the substantially predetermined edge position nearer to the drive pin 9 with respect to the center $O_3$ of the fulcrum pin 6, both before and after the floppy disk is gripped, a length 1 of the swingable member 5 (FIG. 5B) is little changed, regardless of whether the floppy disk is mounted or dismounted, and thus the amount of change of an index position is very small. As a result, an accurate recording and reproduction can be carried out at all times, and the interchangeability of floppy disks is greatly improved.

Moreover, since the object of the present invention can be achieved in such a manner that a direction in which the force $F_4$ is applied by the spring 11 to urge the swingable member 5 is inclined by an angle $\alpha$ in the direction opposite to the rotating direction of the turntable 2 with respect to the center line x', the structure of the device is very simple and can be easily made.

A further improved disk gripping device according to the present invention will be described below with reference to another embodiment thereof.

Figure 1:
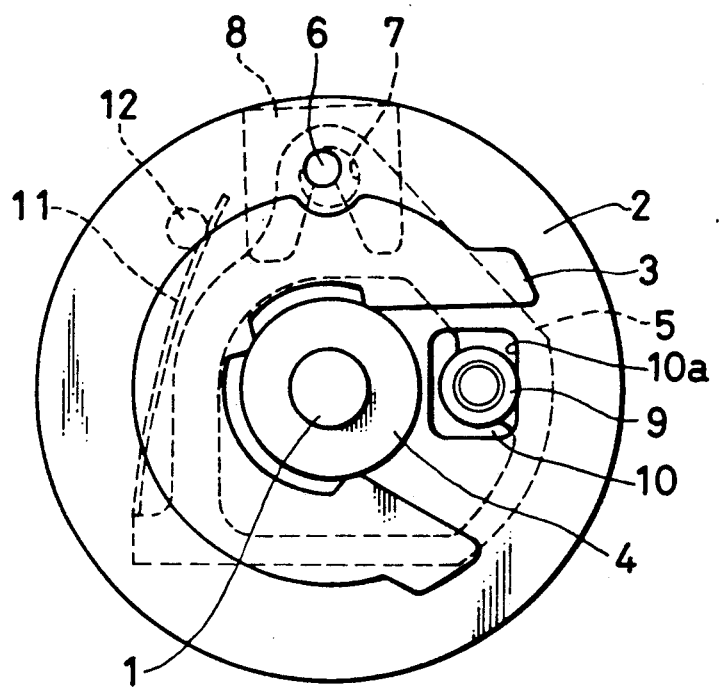
FIG. 1 is a plan view of a turntable incorporated in a prior art disk gripping device.
Figure 2:
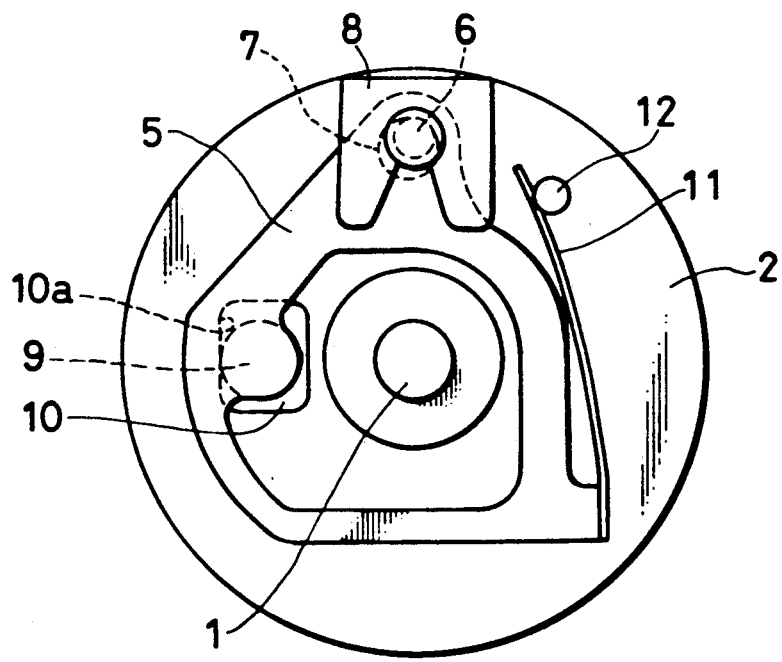
FIG. 2 is a rear elevation of the turntable of FIG. 1.
Figure 3:
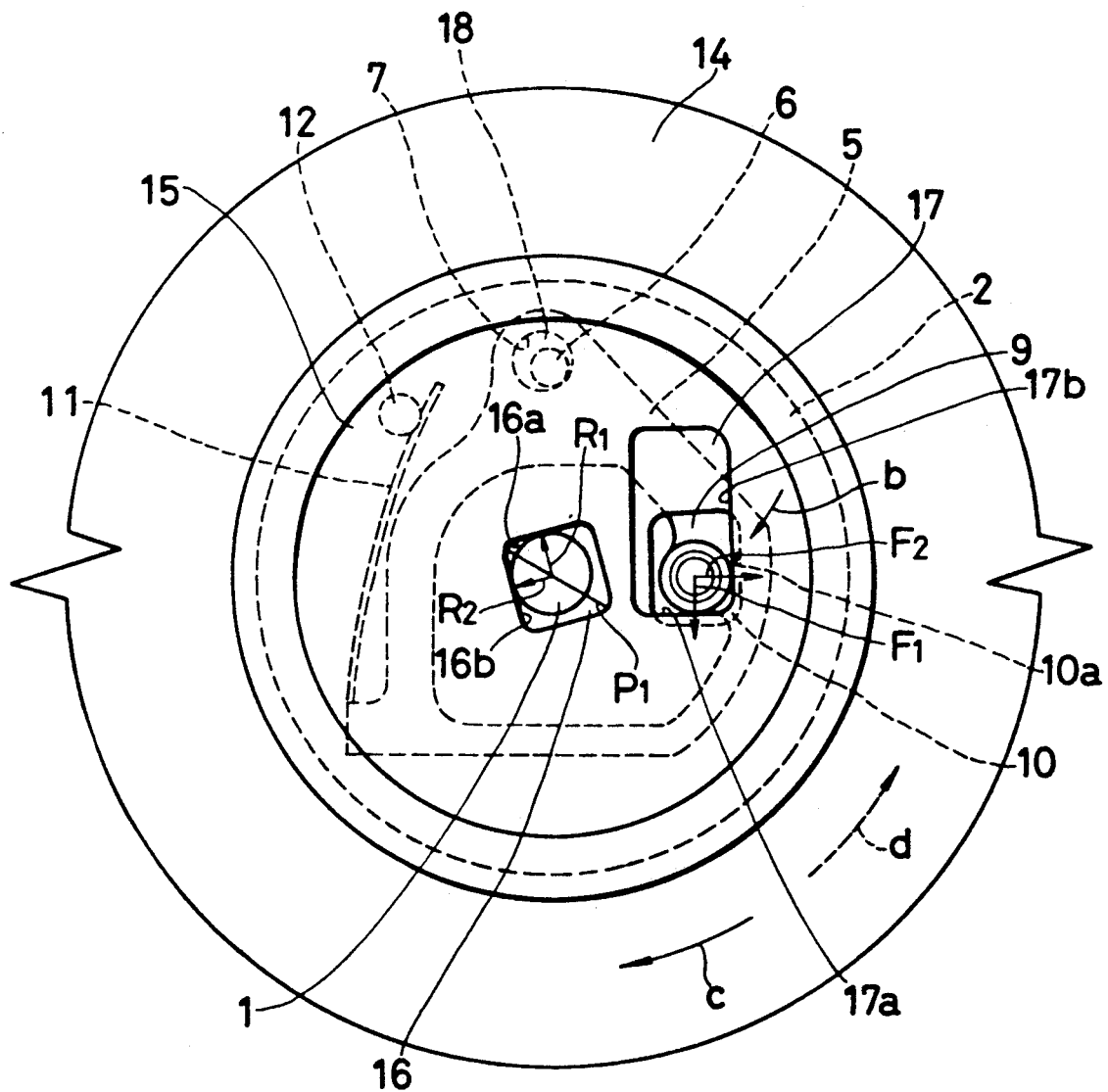
FIG. 3 is a plan view of the turntable of FIG. 1, after a floppy disk is gripped.
Figure 4:
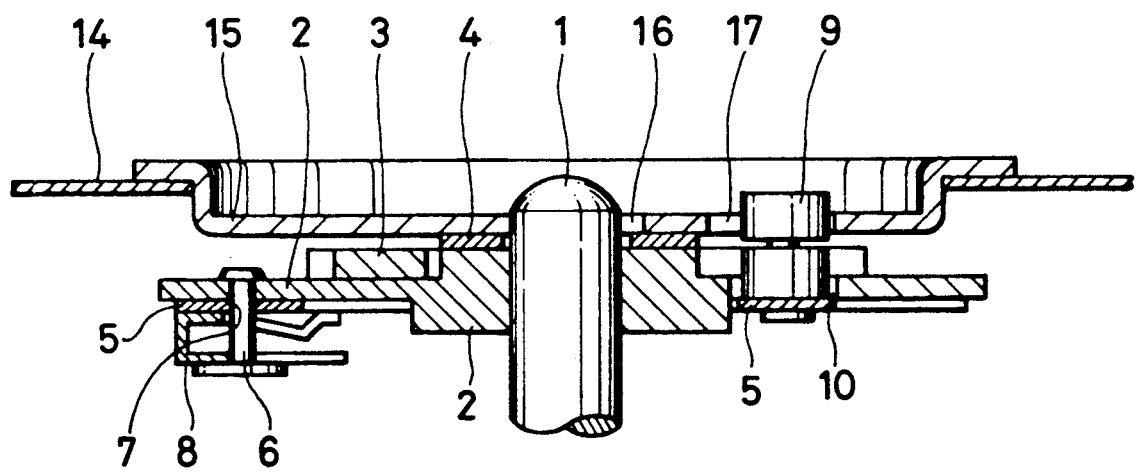
FIG. 4 is a longitudinal sectional view of the turntable with the floppy disk of FIG. 3.
Figure 5A:
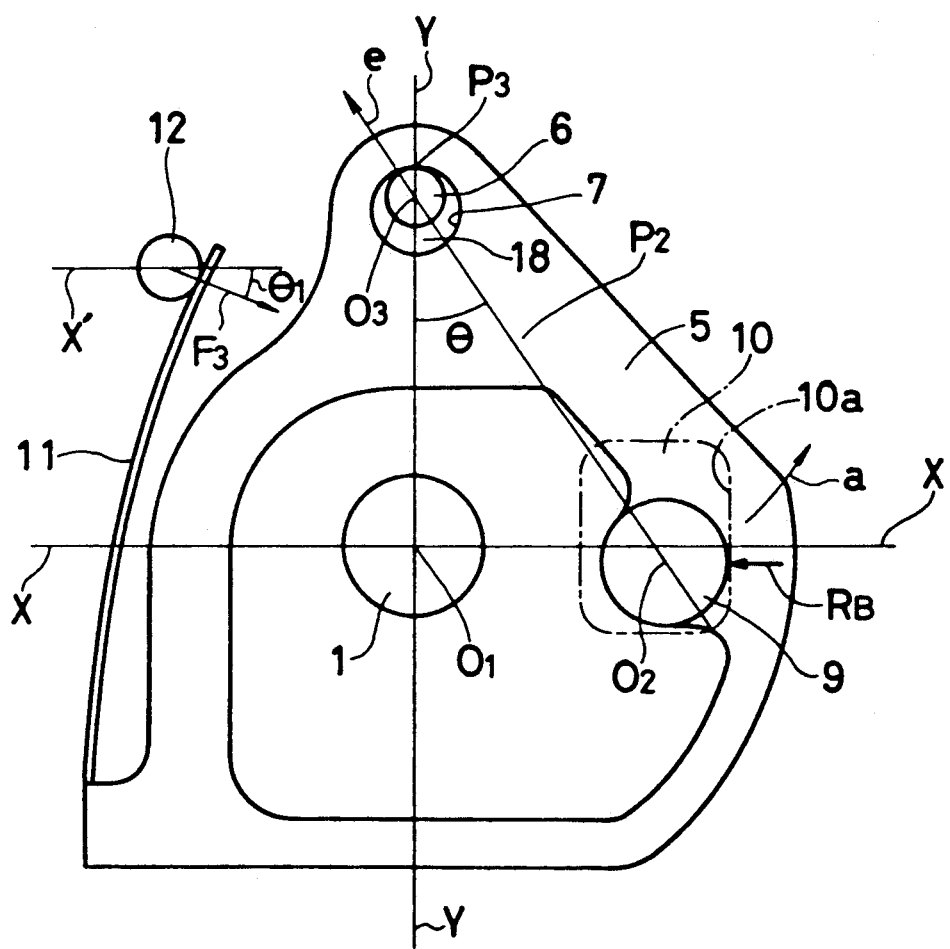
FIG. 5A is a plan view of major elements of the turntable of FIG. 1, before the floppy disk is gripped.
Figure 5B:
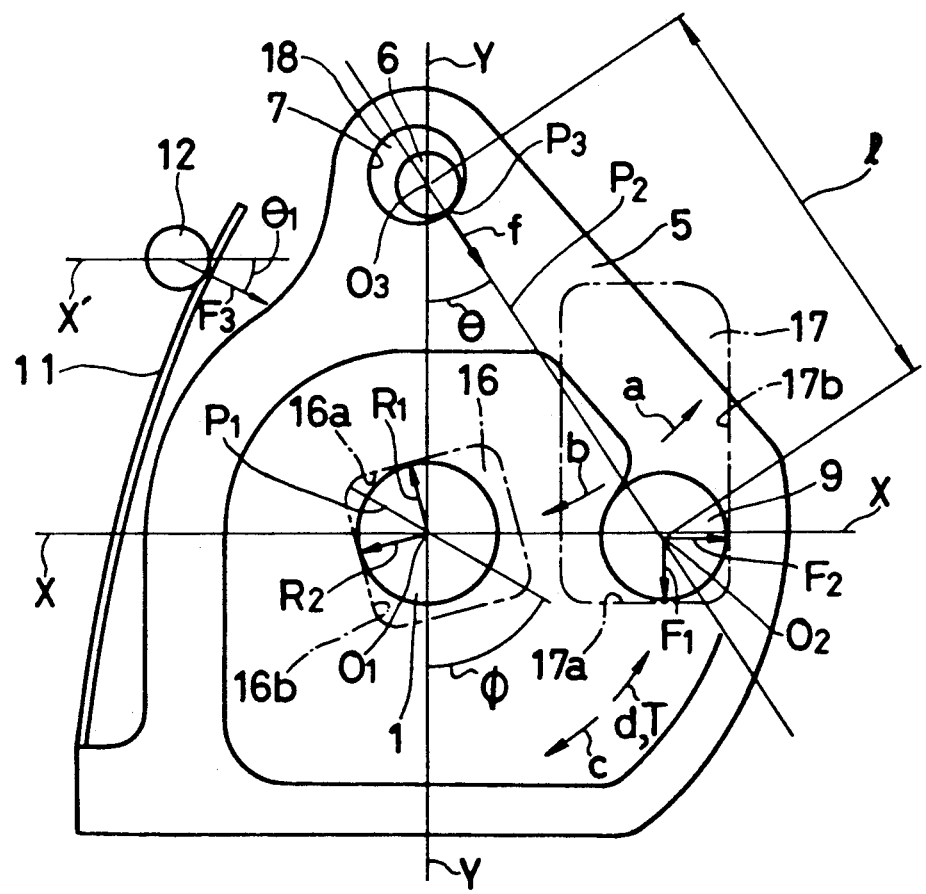
FIG. 5B is a plan view of the major elements illustrated in FIG. 5A, after the floppy disk is gripped.
Figure 6:
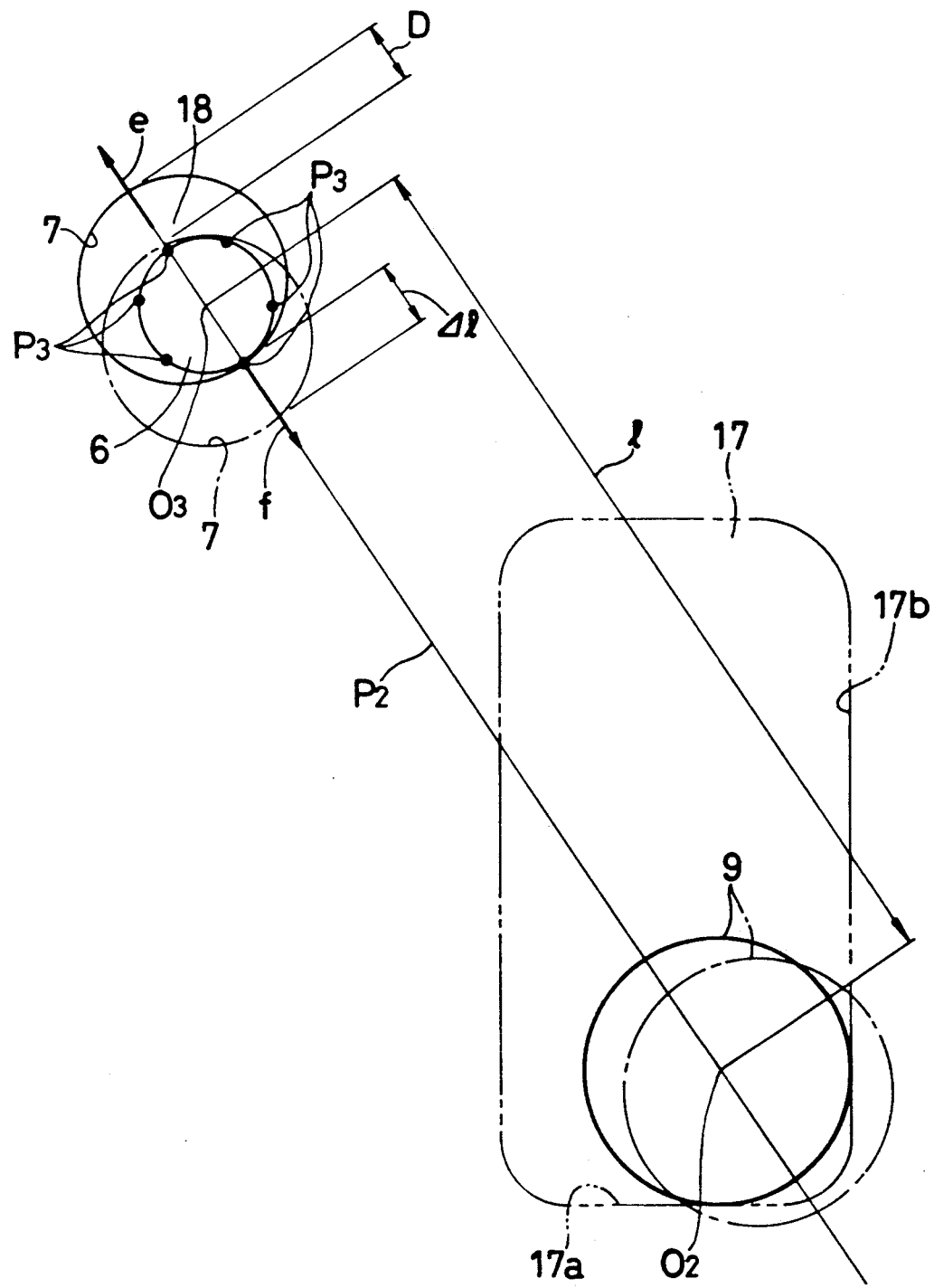
FIG. 6 is a schematic plan view explaining a positional change of a point of a fulcrum hole with a fulcrum pin in the disk gripping device of FIG. 1.
Figure 10:
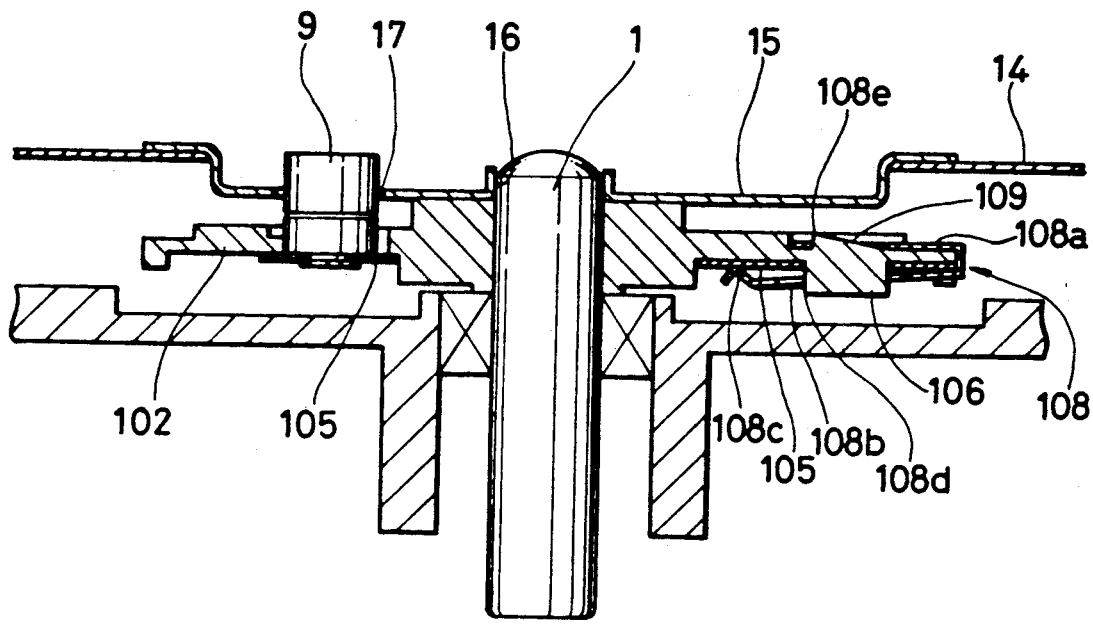
FIG. 10 is a cross sectional view showing another embodiment according to the present invention.

In FIG. 10, designated at 102 is a disk-like turntable molded from magnetized plastic, i.e.., a "magnetic plastic", which eliminates the need to provide the independent magnetic plate 3 shown in FIG. 4.

Further, a fulcrum pin 106 projecting from the turntable 102 and serving as the center of rotation of a swingable member 105 is integrally formed with the turntable 102, which eliminates the need to provide the hole in the turntable 2 for holding the fulcrum pin 106 therein, as shown in FIG. 4. In addition, the securing of the fulcrum pin 106 by a screw or caulking is eliminated.

Figure 11:
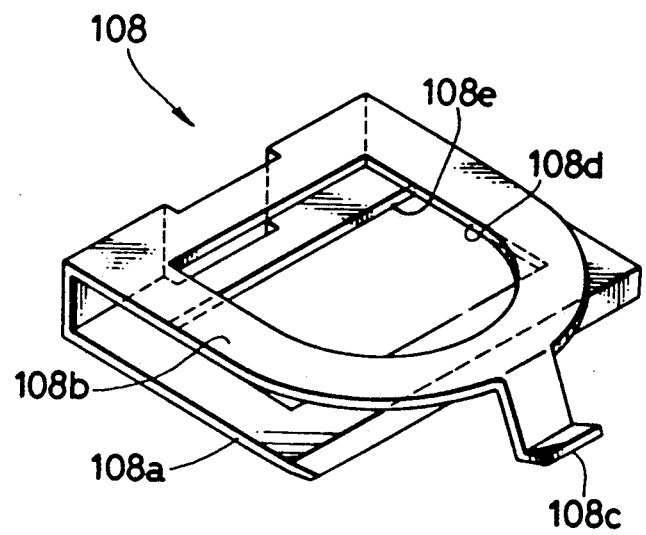
FIG. 11 is a perspective view of an elastic member used in the another embodiment.

Further, an elastic member 108 shown in FIG. 11 is composed of a channel-shaped thin metal plate. When the elastic member 108 is fitted from the outer periphery of the turntable 102 in a state such that the swingable member 105 is placed on the lower surface of the turntable 102, as shown in FIG. 10, the upper surface of the turntable 102 is pressed by one flangeportion 108a of a pair of the upper and lower flangeportions 108a, 108b of the elastic member 108, and the lower surface of the swingable member 105 is pressed by the projection 108c provided at the extreme end of the other flange-portion 108b, so that the swingable member 105 is secured to the turntable 102 from the upper and lower sides thereof.

Note, in FIG. 11, 108e designates an aperture formed in the flange-portion 108a, which is locked to an engaged portion 109 formed on the upper surface of the turntable 102 shown in FIG. 10, and 108d designates an aperture formed in the flange-portion 108b, which is locked to the fulcrum pin 106.

As described above, since the turntable 102 is secured to the elastic member 108 from the upper and lower sides thereof by the elastic member 108 having a channel-shaped section, a disk gripping device which can be easily secured is provided.

Although the present invention has been described with reference to the embodiments, it should be understood that the present invention is not limited to the above embodiments, but various effective modifications may be made therein based on the technical idea of the present invention.

For example, although the embodiment shows the leaf spring integrally formed with the swingable member 5 by pressing, as the leaf spring 11 for urging the swingable member 5, the leaf spring 11 may be any type of spring such as an expanded coil spring, compressed coil spring, linear-shaped spring or the like.

Further, the present invention is not limited to the disk gripping device for a floppy disk apparatus, but also can be applied to various disk devices for recording and reproducing a disk-like recording medium by various systems.

What is claimed is:

1. A device for gripping a disk-like recording medium on a turntable, the recording medium being provided with a core, the core being formed with a central aperture and a positioning aperture, the central aperture having a pair of adjacent edges which are substantially perpendicular to each other and the positioning aperture having a peripheralside edge and a forward-side edge, and the disk gripping device comprising:
   a rotatable shaft;
   a turntable rotated together with the shaft;
   a fulcrum pin connected to the turntable;
   a swingable member which is formed with a fulcrum hole loosely receiving the fulcrum pin and rotatably secured to the turntable by connection to the fulcrum pin and has a free end;
   a drive pin secured to the free end of the swingable member; and
   a spring biasing the swingable member in a direction such that the drive pin is urged to move in a direction away from the shaft;
   wherein the shaft and the drive pin are fitted respectively into the central aperture and the positioning aperture to thereby cause the recording medium to be gripped on the turntable, whereby, when the turntable is rotated, the drive pin is pressed against both the peripheral-side edge and the forward-side edge of the positioning aperture, with a result that the shaft is pressed against the pair of adjacent edges of the central aperture, so that the core of the recording medium is accurately position with respect to the shaft,
   the device being characterized in that a contact point of the fulcrum hole of said swingable member with said fulcrum pin is held at a substantially predetermined edge position of said fulcrum hole which is nearest to said drive pin, both before and after said recording medium is gripped on said turntable.

2. A disk gripping device according to claim 1 further comprising an elastic member formed with a channel-shaped section and having spaced-apart flanges, wherein said swingable member and said turntable are connected together in close proximity to said fulcrum pin by being held between said flanges.

3. A disk gripping device according to claim 2 wherein said elastic member is formed with an engaging aperture in which said fulcrum pin is engaged.

4. A disk gripping device according to claim 2 in which said turntable is formed with an engaged portion with which said channel elastic member is engaged.

5. A disk gripping device according to claim 1 in which said turntable is molded from a magnetic plastic.

6. A disk gripping device according to claim 1 in which said fulcrum pin is integrally formed with said turntable.

7. A disk gripping device according to claim 1 in which said swingable member is integrally formed with said spring by a press working of an elastic sheet.

* * * * *